(12) United States Patent
Bernal et al.

(10) Patent No.: US 11,421,054 B2
(45) Date of Patent: Aug. 23, 2022

(54) PRODUCING A POLYETHYLENE POLYMER

(71) Applicant: Univation Technologies, LLC, Houston, TX (US)

(72) Inventors: Samuel Bernal, Austwell, TX (US); Mark G. Goode, S. Charleston, WV (US); Francois Alexandre, Saint-Leonard (CA); William A. Matthews, Hilton Head Island, SC (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 17/078,342

(22) Filed: Oct. 23, 2020

(65) Prior Publication Data

US 2021/0047445 A1 Feb. 18, 2021

Related U.S. Application Data (63) Continuation of application No. 16/462,610, filed as application No. PCT/US2017/063261 on Nov. 27, 2017, now Pat. No. 11,014,998.
(Continued)

(51) Int. Cl.
*C08F 110/02* (2006.01)
*C08F 2/34* (2006.01)
(Continued)

(52) U.S. Cl.
CPC .............. *C08F 110/02* (2013.01); *C08F 2/34* (2013.01); *C08F 4/69* (2013.01); *C08F 2/38* (2013.01);
(Continued)

(58) Field of Classification Search
None
See application file for complete search history.

(56) References Cited

U.S. PATENT DOCUMENTS 4,521,573 A 6/1985 Lee et al.
5,844,054 A * 12/1998 Samples ................. C08F 10/02
526/60
(Continued)

FOREIGN PATENT DOCUMENTS

EP 0866077 9/1998
WO 2008121187 10/2008

OTHER PUBLICATIONS

Shenoy, A. V. and Saini, D. R. "Melt Flow Index: More Than Just a Quality Control Rheological Parameter. Part II". Advances in Polymer Technology. 1986, 6(2), 125-145. (Year: 1986).*
(Continued)

*Primary Examiner* — Richard A Huhn
(74) *Attorney, Agent, or Firm* — Brooks, Cameron & Huebsch, PLLC (57) ABSTRACT

The present disclosure provides for a system and method for producing a polyethylene polymer (PE) that includes measuring a melt flow index (MFI) of the PE, comparing the measured value of the MFI to a predetermined desired range for the MFI, changing a catalyst feed rate to the polymerization reactor based on the compared values of the MFI, where changes in the catalyst feed rate preemptively compensate for subsequent changes in an oxygen flow rate to the polymerization reactor that maintain a predetermined residence time and bring the MFI of the PE into the predetermined desired range for the MFI; and changing the oxygen flow rate to the polymerization reactor thereby maintaining both the predetermined residence time and bringing the MFI of the PE into the predetermined desired range for the MFI. The measuring and comparing steps are repeated to ensure the measured value of the MFI is within the predetermined desired range of the MFI at the predetermined residence time.

8 Claims, 2 Drawing Sheets

Related U.S. Application Data

(60) Provisional application No. 62/426,840, filed on Nov. 28, 2016.

(51) Int. Cl.
    *C08F 4/69*     (2006.01)
    *C08F 2/38*     (2006.01)
    *C08F 10/02*     (2006.01)

(52) U.S. Cl.
    CPC .......... *C08F 10/02* (2013.01); *C08F 2400/02* (2013.01); *C08F 2500/12* (2013.01)

(56) References Cited

U.S. PATENT DOCUMENTS

| | | |
|---|---|---|
| 6,846,884 B2 | 1/2005 | Parrish et al. |
| 6,881,783 B1 | 4/2005 | Verhelst et al. |
| 9,840,603 B2 | 12/2017 | Cookson et al. |
| 2003/0105247 A1 | 6/2003 | Braganca et al. |
| 2006/0058410 A1 | 3/2006 | Yu et al. |
| 2008/0096993 A1 | 4/2008 | Casati et al. |
| 2012/0108690 A1 | 5/2012 | Klesczewski et al. |
| 2019/0161568 A1 | 5/2019 | Goode et al. |

OTHER PUBLICATIONS

International Search Report & Written Opinion for related PCT Application No. PCT/US2017/063261, dated Jan. 31, 2018 (9 pgs).
International Preliminary Reporton Patentability for related PCT Application No. PCT/US2017/063261, dated Jun. 6, 2019 (6 pgs).

* cited by examiner

PRODUCING A POLYETHYLENE POLYMER

This application is a Continuation Application of U.S. Ser. No. 16/462,610, having a filing date of May 21, 2019 and published as U.S. Pub. No. US 2020/0079886 A1 on Mar. 12, 2020, which is a National Stage Application under 35 U.S.C. § 371 of International Application Number PCT/US2017/063261, filed Nov. 27, 2017 and published as WO 2018/098425 on May 31, 2018, which claims the benefit of U.S. Provisional Application 62/426,840, filed Nov. 28, 2016, the entire contents of which are incorporated herein by reference in its entirety.

TECHNICAL FIELD

The present disclosure relates to methods for producing a polymer and in particular to methods for producing a polyethylene polymer.

BACKGROUND

In fluidized bed gas phase methods for producing a polyethylene polymer, reactants such as gaseous ethylene, catalyst, hydrogen and other raw materials are converted into a solid polyethylene polymer. Polymerization reactors for such fluidized bed gas phase methods can include a reactor vessel, a compressor, and a cooler (heat exchanger). During production, the polymerization reaction is maintained in a two-phase fluidized bed of granular polyethylene and gaseous reactants by a fluidizing gas which is passed through a distributor plate near the bottom of the reactor vessel. The heat of reaction is transferred to a circulating gas stream, which is compressed and cooled in an external recycle line and then reintroduced into the bottom of the reactor vessel where it passes through the distributor plate. Make-up feed-streams of the reactants are added to maintain the desired reactant concentrations.

The properties of the polyethylene polymer formed by such a fluidized bed gas phase method can be controlled by varying one or more operating conditions of the fluidized bed gas phase method. Such operating conditions can include an operating temperature, an amount of catalyst present in the reactor vessel, a type and/or a quantity of catalyst and an amount of gaseous reactants present in the reactor vessel, among others. Such properties of the polyethylene polymers can include molecular weight, molecular weight distribution, polymer density, and the melt flow index of the polyethylene polymer, for example. Of these properties, the melt flow index can be measured to provide an indirect measure of the molecular weight of the polyethylene polymer, with a higher melt flow rate corresponding to a relatively lower molecular weight and lower melt flow rate corresponding to a relatively higher molecular weight.

The operating conditions may also influence a production rate of the polyethylene polymer. For a number of applications, it may be desirable in operating a polymerization reactor to have a production rate of the polyethylene polymer that is constant such that the polyethylene polymer has, among other things, a melt flow index in a desired range. It may also desirable to have as high of a production rate of the polyethylene polymer as possible while still producing the polyethylene polymer in the desired range of the melt flow index. Having a production rate that is constant can require having a residence time of the polyethylene polymer coming from the polymerization reactor that is also constant. A residence time is the average amount of time the components used to form the polyethylene polymer spends in the polymerization reactor, assuming no dead or stagnant zones within the polymerization reactor. All other things staying the same, as the residence time increases, the melt flow index of the polyethylene polymer decreases (e.g., the average molecular weight goes up the longer the polyethylene polymer stays in the reactor vessel), and when the residence time decreases, the melt flow index increases (e.g., the average molecular weight goes down the shorter the polyethylene polymer stays in the reactor vessel).

One significant challenge is getting to a steady state that produces the polyethylene polymer at the desired production rate within a desired melt flow index range. This can require making changes in the amount of catalyst present in the reactor vessel, the type and the quantity of catalyst and the partial pressures of the gaseous reactants present in the reactor vessel. One approach to controlling the melt flow index of the polyethylene polymer is to feed an adjunct material to the reactor vessel. For example, oxygen added to the gas phase fluidized bed in the reactor vessel tends to function as a catalyst "poison" that terminates polymerization. This generally results in an increase in the melt flow index of the polyethylene polymer. Adding oxygen to control the melt flow index, however, can cause changes in the residence time, which in turn can cause further changes in the melt flow index. Given this scenario, holding the residence time constant so as to maximize the production rate of the polyethylene polymer becomes extremely challenging from a process control standpoint.

So, there is a need in the art for the ability to maintain a constant value for a residence time so as to maximize the production rate of the polyethylene polymer coming from the polymerization reactor while accommodating changes in oxygen flow rates to bring the molecular weight of the polyethylene polymer into a desired melt flow index range.

SUMMARY

The present disclosure provides a method of bringing a melt flow index (MFI) of a polyethylene polymer into a predetermined desired range of the MFI while maintaining a constant value of a predetermined residence time of the polyethylene polymer. Bringing the MFI of the polyethylene polymer produced at the predetermined residence time into the predetermined desired range of the MFI is accomplished by changing an oxygen flow rate of an oxygen feed to the polymerization reactor. Changes in the oxygen flow rate to adjust the MFI, however, need to be compensated for by preemptively changing the catalyst flow rate of a feed of a chromium based catalyst in order to maintain the constant value of the predetermined residence time. So, the timing of the changes in the catalyst flow rate relative to the changes in oxygen flow rate are used to provide the polyethylene polymer with the MFI in the predetermined desired range of the MFI while maintaining the constant value of the predetermined residence time.

Specifically, the present disclosure provides a method for producing a polyethylene polymer in a polymerization reactor, where the polymerization reactor receives a feed of ethylene, a feed of a chromium based catalyst and a feed of oxygen, where the polyethylene polymer produced in the polymerization reactor has a predetermined residence time in the polymerization reactor and a predetermined desired range of a melt flow index (MFI). The method includes (a) measuring the MFI of the polyethylene polymer being produced in the polymerization reactor at the predetermined residence time to give a measured MFI value of the polyethylene polymer. The method further includes (b) comparing the measured MFI value of the polyethylene polymer to the predetermined desired range of the MFI to give a comparison. The method uses an oxygen flow rate of the feed of oxygen to the polymerization reactor to eventually maintain the predetermined residence time and to bring the MFI of the polyethylene polymer being produced in the polymerization reactor with the chromium based catalyst into the predetermined desired range of the MFI of the polyethylene polymer. Before this happens, however, the method preemptively (c) changes a catalyst feed rate of the feed of the chromium based catalyst to the polymerization reactor when, based on the comparison from (b), the measured value of the MFI is outside the predetermined desired range of the MFI. Specifically, the change in the catalyst feed rate of the feed of the chromium based catalyst is calibrated to preemptively compensate for an anticipated subsequent change in the oxygen flow rate of the feed of oxygen to the polymerization reactor. As mentioned, the anticipated subsequent change in oxygen flow rate of the feed of oxygen to the polymerization reactor is an adjustment for maintaining the predetermined residence time and for bringing the MFI of the polyethylene polymer being produced in the polymerization reactor into the predetermined desired range for the MFI of the polyethylene polymer. The method also includes (d), which at a predetermined time after starting (c) provides for changing the oxygen flow rate of the feed of oxygen to the polymerization reactor thereby both maintaining the predetermined residence time and bringing the MFI of the polyethylene polymer being produced in the polymerization reactor with the chromium based catalyst into the predetermined desired range of the MFI of the polyethylene polymer. In (e), the steps of (a) and (b) provided herein are repeated after (d) to determine that the measured value of the MFI is within the predetermined desired range of the MFI at the predetermined residence time.

Depending upon the desired change in MFI, changing the catalyst feed rate of the feed of the chromium based catalyst to the polymerization reactor includes increasing the catalyst feed rate to the polymerization reactor, where changing the oxygen flow rate of the feed of oxygen to the polymerization reactor includes increasing the oxygen flow rate to the polymerization reactor at the predetermined time selected from 15 minutes to 2 hours after starting step (c). Alternatively, changing of the catalyst feed rate of the feed of the chromium based catalyst to the polymerization reactor includes decreasing the catalyst feed rate to the polymerization reactor, where changing the oxygen flow rate of the feed of oxygen to the polymerization reactor includes decreasing the oxygen flow rate to the polymerization reactor at the predetermined time selected from 15 minutes to 2 hours after starting step (c).

The oxygen flow rate of the feed of oxygen to the polymerization reactor is from 1 ppb to about 500 ppb by volume of the ethylene feed to the polymerization reactor. As oxygen is a poison to chromium based catalysts, changes in the oxygen flow rate of the feed of oxygen to the polymerization reactor preferably bring the MFI of the polyethylene polymer being produced in the polymerization reactor to a median value of the predetermined desired range for the MFI of the polyethylene polymer. The changes in the oxygen flow rate to the polymerization reactor also maintain the predetermined residence time at a constant value, as will be discussed more fully herein.

BRIEF DESCRIPTION OF THE DRAWINGS

FIG. 2A-2E are data for example polyethylene polymers in which FIG. 2A is the residence time (hrs) for the polyethylene polymer; FIG. 2B is the production rate in tonne/hour; FIG. 2C is the melt flow index ($I_{21}$) dg/min, measured according to ASTM D1238; FIG. 2D is the $O_2/C_2$ molar feed ratio $ppb_v$; FIG. 2E is a catalyst feed rate (kg/hr) and catalyst productivity (tonne polyethylene/kg catalyst) for the example polyethylene polymers.

DETAILED DESCRIPTION

As discussed herein, the present disclosure provides methods for producing polyethylene polymers. These methods for producing polyethylene polymers can include bringing a melt flow index (MFI) of a polyethylene polymer into a predetermined desired range of the MFI, while maintaining a constant value of a predetermined residence time of the polyethylene polymer. Bringing the MFI of the polyethylene polymer produced at the predetermined residence time into the predetermined desired range of the MFI can be accomplished by changing an oxygen flow rate of an oxygen feed to a polymerization reactor utilized for producing the polyethylene polymers. To maintain the constant value of the predetermined residence time, however, changes in the oxygen flow rate to adjust the MFI may be compensated for by preemptively changing a catalyst flow rate of a feed of chromium based catalyst used to produce the polyethylene polymer. So, as discussed herein, timing of the changes in the catalyst flow rate, relative to the changes in oxygen flow rate, are used to provide the polyethylene polymer with the MFI in the predetermined desired range of the MFI, while maintaining the constant value of the predetermined residence time.

As noted, changes in the catalyst flow rate of the feed of the chromium based catalyst are made before making changes in the oxygen flow rate of an oxygen feed to the polymerization reactor. Staggering the flow rates changes can be utilized because of the relative difference in the response of the polyethylene polymer reaction to the changes in the catalyst feed rate and the changes in oxygen feed rate. For example, changes in oxygen flow rate of a feed of oxygen to the polymerization reactor can result in rapid changes in the residence time of the polyethylene polymer being produced. In comparison, changes in the catalyst feed rate of the chromium based catalyst may have a much longer induction period before changes in the residence time of the polyethylene polymer being produced are seen.

So, in changing the oxygen flow rate to adjust the MFI the residence time can deviate from the constant value of the predetermined residence time. Knowing this, the catalyst flow rate of the feed of the chromium based catalyst is changed in a calibrated manner to preemptively compensate for an anticipated subsequent change in the oxygen flow rate of the feed of oxygen to the polymerization reactor. As discussed herein, the calibrated manner of changing the catalyst flow rate can be based, at least in part, on the catalyst feed rate, induction period data for the chromium based catalyst, residence time of the chromium based catalyst, activity rates of the chromium based catalyst, and/or decay rates of the chromium based catalyst being utilized to produce the polyethylene polymer. Once the effect of the change in the catalyst flow rate of the chromium based catalyst begins to take effect (e.g., when the induction period ends and the residence time begins to deviate from the constant value of the predetermined residence time beyond a predetermined threshold) the change in the oxygen flow rate can be used to both bring the MFI of the polyethylene polymer into the predetermined desired range for the MFI of the polyethylene polymer and to restore the residence time to the constant value.

As used herein, a predetermined residence time is a residence time that is selected for use in producing a polyethylene polymer in a polymerization reactor. As more fully discussed herein, the polymerization reactor receives at least a feed of ethylene, a feed of a chromium based catalyst and a feed of oxygen to produce the polyethylene polymer at a steady state. The predetermined residence time is selected based on the desired production rate of the polyethylene polymer for the given operating conditions of the polymerization reactor and flow rates of at least a feed of ethylene, a feed of a chromium based catalyst and a feed of oxygen to produce the polyethylene polymer at the steady state.

The residence time value for the present disclosure can be determined from a mass of the polyethylene polymer produced. For instance, a mass of polyethylene polymer removed from the polymerization reactor for a given time (e.g., kilogram per hour) and the overall mass (e.g., kilogram) of the reaction bed inside the polymerization reactor may be utilized. For the present disclosure, determining the residence time for producing the polyethylene polymer at steady state can be based on an assumption of no dead or stagnant zones inside the polymerization reactor. As known in the art, the overall mass of the reaction bed inside the polymerization reactor can be determined, among other ways, by measuring a pressure drop across the reaction bed. For a mass of the polyethylene polymer removed from the polymerization reactor for a given time the residence time can be determined by dividing an overall mass of the reaction bed by the mass of the polyethylene polymer removed from the polymerization reactor for the given time. So, for a desired production rate a predetermined residence time, as used herein, can be calculated and used in operating the polymerization reactor to produce the polyethylene polymer.

As discussed herein, it is desired to produce a polyethylene polymer in the polymerization reactor at a constant value of the predetermined residence time. For example, the constant value of the predetermined residence time can be selected for a given polymerization reactor to provide a particular production, e.g., a maximized production, of the polyethylene polymer having a desired MFI in a given polymerization reactor. The polyethylene polymer being produced initially at the predetermined residence time, however, may not necessarily have a MFI that falls into the predetermined desired range of the MFI. To achieve a MFI in the predetermined range, the oxygen flow rate of the oxygen feed, can be varied to change the MFI of the polyethylene polymer. However, varying the oxygen flow rate can change the residence time of the polyethylene polymer being produced. So, as mentioned, to help ensure that the predetermined residence time is maintained at the constant value for the polyethylene polymer, the catalyst feed rate of the chromium based catalyst can be preemptively changed in anticipation of the changes in the oxygen flow rate of the oxygen feed that will bring the MFI of the polyethylene polymer into the predetermined desired range of the MFI.

In practicing the present disclosure, a polyethylene polymer can be produced in a polymerization reactor that receives at least a feed of ethylene, a feed of a chromium based catalyst, and a feed of oxygen to produce the polyethylene polymer at steady state and at a predetermined residence time. At steady state, the polymerization reactor can operate with a constant value of the predetermined residence time so as to achieve a desired production rate of the polyethylene polymer being produced. Preferably, the production rate is a constant production rate. Further details regarding producing the polyethylene polymer are discussed more fully herein.

In addition to producing the polyethylene polymer in the polymerization reactor with a predetermined residence time, it is also a goal to produce the polyethylene polymer having a MFI that falls within a predetermined desired range of the MFI. The predetermined desired range of the MFI has a predetermined upper limit and a predetermined lower limit, as will be discussed more herein. As used herein, the MFI "falls within" or is "found in" the predetermined desired range of the MFI when a measured value of the MFI of the polyethylene polymer is equal to either of the predetermined upper limit or the predetermined lower limit, or a value between the predetermined upper limit and the predetermined lower limit defining the predetermined desired range.

As an initial step, a sample of the polyethylene polymer produced at steady state with a predetermined residence time can be taken from the polymerization reactor. The MFI of this sample can be measured to provide a measured MFI value of the polyethylene polymer. MFI can be described as a measure of the ease of flow of the melt of a thermoplastic polymer, e.g. the polyethylene polymer as described herein. MFI can be defined as the mass of polymer in grams flowing in 10 minutes through a capillary of a particular diameter and length by a pressure applied via prescribed alternative gravimetric weights for alternative prescribed temperatures. The MFI can be utilized as an indirect measure of molecular weight, where for example the higher the MFI the lower the molecular weight of the polymer and the lower the MFI the higher the molecular weight of the polymer.

A variety of MFI standards such as MFI ($I_2$), MFI ($I_5$) and/or MFI ($I_{21}$), and melt flow ratios ($I_{21}/I_2$) and ($I_{21}/I_5$) can be used with the present disclosure. For example, MFI ($I_2$) can be measured using ASTM D-1238, Condition FR-190/2.16. Melt flow index ($I_5$) can be measured using ASTM D-1238, Condition FR-190/5.0. Melt flow index ($I_{21}$) can be measured using ASTM D-1238, Condition FR-190/21.6. In one example, melt flow index measurements for MFI ($I_2$), MFI ($I_5$) and/or MFI ($I_{21}$) can be conducted using a commercial indexer 162, which include indexer models MP200 and MP600 from Tinius Olsen, Inc., 1065 Easton Road, PO Box 1009, Horsham, Pa. 19044-8009, USA. Ratios between various combinations of the MFI for one material at different gravimetric weights (e.g., MFI ($I_2$), MFI ($I_5$) and/or MFI ($I_{21}$)) may be used as a measure for the broadness of the molecular weight distribution.

As mentioned, it is preferred that the polyethylene polymer coming from the polymerization reactor have a MFI with a measured value found in the predetermined desired range for the MFI of the polyethylene polymer. The predetermined desired range for the MFI of the polyethylene polymer can be for any one of MFI ($I_2$), MFI ($I_5$) and/or MFI ($I_{21}$) discussed herein. In addition, the specific values of such a desired range for the MFI can be a function of the intended application for the polyethylene polymer, where the predetermined desired range for the MFI of the polyethylene polymer has the predetermined upper limit and the predetermined lower limit. Preferably, changes in the oxygen flow rate of the oxygen feed to the polymerization reactor are used to bring the MFI of the polyethylene polymer being produced in the polymerization reactor to a median value of the predetermined desired range for the MFI of the polyethylene polymer.

Examples of a predetermined desired range for the MFI ($I_{21}$) of the polyethylene polymer includes upper values of 50 dg/min, 30 dg/min, 25 dg/min and 20 dg/min and includes lower values of 1 dg/min, 1.5 dg/min, 2 dg/min and 3 dg/min for MFI ($I_{21}$). Preferred ranges for MFI ($I_{21}$) include plus and minus 25% of the target MFI ($I_{21}$); plus and minus 20% of the target MFI ($I_{21}$); plus and minus 15% of the target MFI ($I_{21}$); plus and minus 10% of the target MFI ($I_{21}$); plus and minus 5% of the target MFI ($I_{21}$); and, plus and minus about 2% of the target MFI ($I_{21}$). Examples of melt flow ratio ($I_{21}/I_2$) values for the polyethylene polymer of the present disclosure can include upper limits of 150, 160, 180 and 200 and includes lower limits of 50, 60, 70 and 80. Preferred ranges for the melt flow ratio ($I_{21}/I_2$) include 50 to 200; 60 to 180; 70 to 160 and 80 to 150. Examples of melt flow ratio ($I_{21}/I_5$) values for the polyethylene polymer of the present disclosure can include upper limits of 28, 30 and 35 and includes lower limits of 10, 15 and 18. Preferred ranges for the melt flow ratio ($I_{21}/I_5$) include 10 to 35, 15 to 30, and 18 to 28.

As previously mentioned, as an initial step the MFI of the sample of the polyethylene polymer produced at steady state with a predetermined residence time can be measured. This measured MFI value can then be compared to the predetermined desired range of the MFI to give a comparison. Based on the comparison, when the MFI value of the sample of the polyethylene polymer formed at steady state is outside the predetermined desired range of the MFI, changes to both the catalyst feed rate of the feed of the chromium based catalyst to the polymerization reactor and the oxygen flow rate of the feed of oxygen to the polymerization reactor can be made.

Oxygen in the polymerization reactor can function as a "poison". For instance, oxygen in the polymerization reactor may terminate reaction sites on chromium based catalysts used in polymerization reactions. So, changes to the oxygen flow rate of the flow of oxygen to the polymerization reactor can be used to control the chromium based catalysts activity, and thereby to control the MFI of the polyethylene polymer produced. Changing the oxygen flow rate of the oxygen flow to control the MFI, however, can cause a change in the residence time, which in turn can cause further variation in the MFI of the polyethylene polymer. For example, increasing the oxygen flow rate to the polymerization reactor acts to increase the MFI of the polyethylene polymer, where increasing the residence time would act to decrease the MFI. Given this scenario, changing the oxygen flow rate of the oxygen flow to the polymerization reactor, so as to hold the predetermined residence time constant while bringing the MFI into the predetermined desired range can be extremely challenging from a process control standpoint.

So, before changes in the oxygen flow rate occur, the present methods preemptively change the catalyst feed rate of the feed of the chromium based catalyst to the polymerization reactor when, based on the comparison discussed above, the measured value of the MFI is outside the predetermined desired range of the MFI. Specifically, the change in the catalyst feed rate of the feed of the chromium based catalyst can be calibrated to preemptively compensate for an anticipated subsequent change in the oxygen flow rate, e.g., of the feed of oxygen, to the polymerization reactor. The anticipated subsequent change in oxygen flow rate of the feed of oxygen to the polymerization reactor can then an adjusted to maintain the predetermined residence time and/or for bringing the MFI of the polyethylene polymer being produced into the predetermined desired range for the MFI of the polyethylene polymer.

Calibrating the change in the catalyst feed rate can be based on at least the induction period, the activity rate, and the decay rate of the catalyst. The MFI value targeted is used to project the required $O_2/C_2$ to achieve the desired targeted aim. The $O_2/C_2$ thus required is used to project the resulting change in catalyst productivity. This may be done at a constant residence time production rate. Based on the new catalyst productivity, the catalyst feed is adjusted to a value that will maintain a steady production rate.

Therefore, in anticipation of changes in the oxygen flow rate to bring the molecular weight of the polyethylene polymer to the desired MFI, the catalyst feed rate is preemptively changed before any changes in the oxygen flow rate to the polymerization reactor occur. This is done because the chromium based catalysts utilized for polyethylene polymer production, as previously discussed, can have a relatively long induction period, as compared to the effect of oxygen discussed herein. As such, the effects of changes in catalyst feed rate in the polymerization reactor are not immediately seen once the catalyst feed rate of the chromium based catalyst changes. In contrast, the effects of oxygen on such chromium based catalysts is much quicker as compared to the effects caused by the changes to the catalyst feed rate. So, the methods disclosed herein utilize changes in the catalyst feed rate of the chromium based catalyst to the polymerization reactor before changes to the oxygen feed rate to the polymerization reactor, so as to help maintain the residence time of the polyethylene polymer as the oxygen flow rate is changing.

The changes to the oxygen flow rate can be made at a predetermined time after starting the change in the catalyst feed rate of the chromium based catalyst. As mentioned, changing the oxygen flow rate of the feed of oxygen to the polymerization reactor can both maintain the predetermined residence time and bring the MFI of the polyethylene polymer being produced into the predetermined desired range of the MFI. The oxygen flow rate of the feed of oxygen to the polymerization reactor can range from 1 ppb to about 500 ppb by volume of the ethylene feed to the polymerization reactor.

Depending upon the desired change in MFI, changing the catalyst feed rate of the feed of the chromium based catalyst to the polymerization reactor can include increasing the catalyst feed rate to the polymerization reactor, where changing the oxygen flow rate of the feed of oxygen to the polymerization reactor can include increasing the oxygen flow rate to the polymerization reactor at a predetermined time selected from 15 minutes to 2 hours after starting the change in the catalyst feed rate of the chromium based catalyst. Alternatively, changing of the catalyst feed rate of the feed of the chromium based catalyst to the polymerization reactor can include decreasing the catalyst feed rate to the polymerization reactor, where changing the oxygen flow rate of the feed of oxygen to the polymerization reactor can include decreasing the oxygen flow rate to the polymerization reactor at the predetermined time selected from 15 minutes to 2 hours after starting the change in the catalyst feed rate of the chromium based catalyst. Other preferred predetermined time values include about 10 minutes to about 3 hours for the delay. After making the changes in the oxygen flow rate of the oxygen flow, the polymerization reactor is allowed to reach a new steady state. A sample of the polyethylene polymer produced at the new steady state can then be taken and the MFI of this sample can be measured using the same test(s) (e.g., MFI ($I_2$), MFI ($I_5$) and/or MFI ($I_{21}$)) used to measure the MFI of the sample taken before the changes in the catalyst flow rate and the oxygen flow rate. The MFI value of the sample taken at the new steady state can be compared to the predetermined desired range of the MFI to determine if the MFI is within the predetermined desired range of the MFI at the predetermined residence time. Finally, on the chance that the measured value of the MFI value of the sample taken at the new steady state does not fall within the predetermined desired range of the MFI at the predetermined residence time, the above described method can be repeated.

By way of example, the method of the present disclosure can be performed using a variety of fluid phase polymerization reactions. For example, such reactions can be carried out in a gas phase polymerization reactor or in a liquid slurry phase polymerization reactor. The polymerization system may comprise a single reactor or two or more reactors in series. While the following discussion features a gas phase polymerization reactor, where the present disclosure has been found to be preferred and especially advantageous, it is to be understood that the general concepts relating to the changes in the catalyst feed rate of the chromium based catalyst and the oxygen flow rate of the oxygen flow to the polymerization reactor to maintain both the predetermined residence time and to bring the MFI of the polyethylene polymer being produced in the polymerization reactor with the chromium based catalyst into the predetermined desired range for the MFI of the polyethylene polymer are applicable to the liquid slurry phase polymerization reactor as well. The present disclosure is not limited to any specific type of gas phase reactor system.

A fluidized bed of the gas phase polymerization reactor can generally include a bed of particles in which the static friction between the particles is disrupted. In each of the aforementioned generally preferred approaches and/or embodiments, the fluidized bed system is a closed fluidized bed system. A closed fluidized bed system can comprise one or more fluids and one or more types of fluidized particles that are generally bounded by a barrier so that the fluids and particles are constrained. For example, a closed fluidized bed system may include a pipeline (e.g., for particle transport); a recirculating fluidized bed system, such as the fluidized bed polymerization reactor system of FIG. 1, as discussed herein; or a solids drying system; any of which may be associated with various residential, commercial and/or industrial applications.

In general, the fluidized bed system can be defined by manufactured (e g., man-made) boundaries comprising one or more barriers. The one or more barriers defining manufactured boundaries can generally be made from natural or non-natural materials. Also, in general, the fluidized bed system (whether open or closed) can be a flow system such as a continuous flow system or a semi-continuous flow (e.g., intermittent-flow) system, a batch system, or a semi-batch system (sometimes also referred to as a semi-continuous system). In many instances, fluidized bed systems that are flow systems are closed fluidized bed systems.

The fluidized bed in preferred embodiments is generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, which can ultimately lead to collapse of the bed. Fluidized beds formed by gases flowing in directions other than vertically include particles flowing horizontally through a pipe, particles flowing downwardly e.g., through a downcomer.

Fluidized beds can also be formed by vibrating or otherwise agitating the particles. The vibration or agitation keeps the particles in a fluidized state.

In general terms, a conventional fluidized bed polymerization process for producing a polyethylene polymer is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the recycle stream or reactor vessel, to replace the polymerized monomer.

Figure 1:
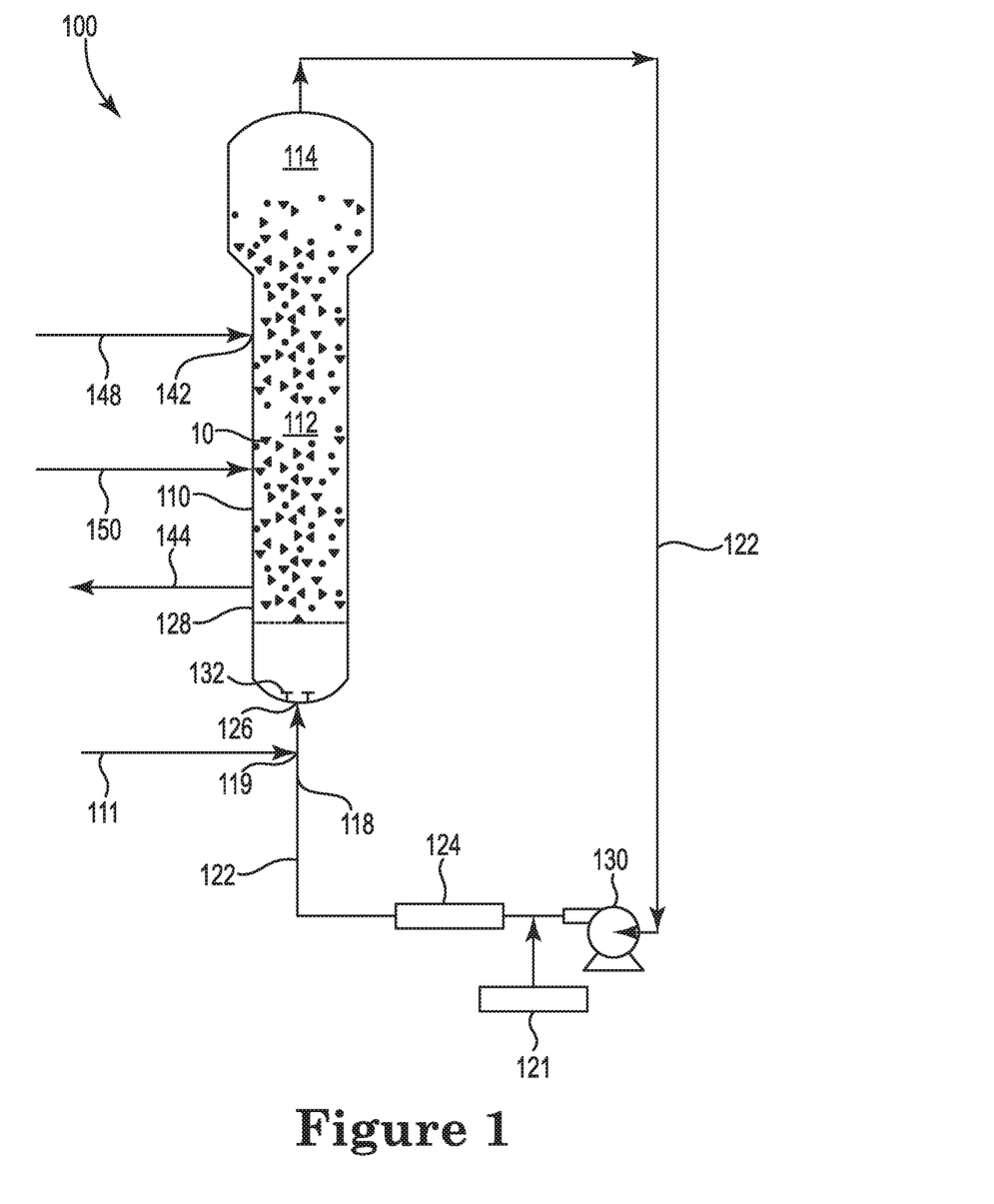
FIG. 1 is a schematic representation of a gas phase polymerization reactor system that may be utilized for producing a polyethylene polymer, according to one or more embodiments.

The method of the disclosure can be described, for example, with reference to FIG. 1, in which a bulk material 10 is present in a polymerization reactor 100. Such bulk material can be gaseous, liquid and/or solid material. In the polymerization reactor 100, illustrative bulk materials may include one or more of reaction raw materials such as ethylene, a chromium based catalyst and oxygen, reaction products such as polymer particles, catalysts, reaction byproducts and other materials. Thus, the bulk material may include substantially pure individual materials as well as combinations of materials, the material(s) being present in one or more phases. A chromium based catalyst is added to the polymerization reactor 100 via an appropriate mechanism such as feed line 148. A gaseous monomer (e.g., ethylene), added to the polymerization reactor 100 via an appropriate mechanism such as feed line 111, is contacted with the chromium based catalyst in the polymerization reactor for polymerizing the monomer to form a polyethylene polymer. Oxygen is added in situ to the polymerization reactor 100 via an appropriate mechanism such as feed line 148 or another feed line 150 in an effective amount for changing the melt flow index (MFI) of the polyethylene polymer as desired and discussed herein.

The polymerization reactor 100 seen in FIG. 1 also provides for a reactor vessel 110 that includes a reaction zone 112 and a velocity reduction zone 114. While a reactor configuration comprising a generally cylindrical region beneath an expanded section is shown in FIG. 1, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 1.

In general, the height to diameter ratio of the reaction zone can vary in the range of about 2.7:1 to about 5:1. The range may vary to larger or smaller ratios and depends mainly upon the desired production capacity. The cross-sectional area of the velocity reduction zone 114 is typically within the range of from about 2.5 to about 2.9 multiplied by the cross-sectional area of the reaction zone 112.

The reaction zone 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec. for polyethylenes. Preferably, the superficial gas velocity is at least 0.2 ft/sec. above the minimum flow for fluidization or from about 0.4 to about 0.7 ft/sec. Ordinarily, the superficial gas velocity will not exceed 5.0 ft/sec. and is usually no more than about 2.5 ft/sec.

On start-up, the polymerization reactor is generally charged with a bed of particulate polymer particles before gas flow is initiated. Such particles help to prevent the formation of localized "hot spots" when catalyst feed is initiated. The particles may be the same as the polymer to be formed or different. When different, they are preferably withdrawn with the desired newly formed polymer particles as the first product. Eventually, a fluidized bed consisting of desired polyethylene polymer particles supplants the start-up bed.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area.

Referring again to FIG. 1, make-up fluids can be fed at points 118 and 119 via recycle line 122. The composition of the recycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the recycle stream and, where desired, at least part of the make-up stream can be returned through recycle line 122 to the reactor, for example at inlet 126 below the bed. Preferably, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover. The recycle stream is then compressed in compressor 130 and passed through heat exchanger 124 where the heat of reaction is removed from the recycle stream before it is returned to the bed. The heat exchanger 124 can also be positioned before the compressor 130. An illustrative heat exchanger 124 is a shell and tube heat exchanger, with the recycle gas traveling through the tubes.

The recycle stream exiting the heat exchange zone is then returned to the reactor at its base 126 and then to the fluidized bed through gas distributor plate 128. A fluid flow deflector 132 is preferably installed at the inlet to the reactor to prevent polymer particles from settling out and agglomerating into a solid mass and to maintain entrained or to re-entrain any particles or liquid which may settle out or become disentrained.

In FIG. 1, polyethylene polymer is discharged from line 144. Although not shown, it is desirable to separate any fluid from the product and to return the fluid to the reactor vessel 110.

In accordance with an embodiment of the present disclosure, the chromium catalyst enters the reactor in solid or liquid form at a point 142 through line 148. The one or more cocatalysts to be added may be introduced separately into the reaction zone where they will react with the chromium catalyst to form the catalytically active reaction product and/or affect the reaction proceeding in the reactor system. However the chromium catalyst and cocatalyst(s) may be mixed prior to their introduction into the reaction zone.

The reactor shown in FIG. 1 is particularly useful for forming polyethylene and/or polypropylene. Process conditions, raw materials and chromium catalysts for forming polyethylene and other polyolefins are found in the references incorporated herein. Illustrative process conditions for polymerization reactions in general are listed below to provide general guidance.

The reaction vessel, for example, has an inner diameter of at least about 2 feet, and is generally greater than about 10 feet, and can exceed 15 or 17 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The present method also includes determining an operating temperature for producing the polyethylene polymer in the polymerization reactor 100 and selecting a chromium based catalyst which may optionally have been reduced with an aluminum alkyl compound based on a desired property of the polyethylene polymer. An ethylene monomer is contacted with the chromium based catalyst in the fluidized bed reactor system. A recycle stream of the fluidized bed reactor system traveling through recycle line 122 is cooled, e.g., by a heat exchanger 124, for maintaining about the optimum operating temperature. The reactor fluidized bed temperature in a gas phase process may vary from about 30° C. to about 115° C. In one approach, the reactor temperature is less than about 40° C. or 30° C., more preferably less than about 20° C., and even more preferably less than about 15° C. below the melting point of the polyethylene polymer being produced. The process can run at even higher temperatures, e.g., less than about 10° C. or 5° C. below the melting point of the polyethylene polymer being produced. Polyethylene, for example, has a melting point in the range of approximately 105° C. to 130° C. or 135° C.

The overall temperature in a gas phase process typically varies from about 30° C. to about 115° C. In one approach, the temperature at the point of highest temperature in the reactor system is less than about 30° C., more preferably less than about 20° C., and even more preferably less than about 15° C. below the melting point of the polyethylene polymer being produced. In a system such as that shown in FIG. 1, the point of highest temperature is typically at the outlet of the compressor 130.

Other gas phase processes contemplated include series or multistage polymerization processes. Also gas phase processes contemplated include those described in U.S. Pat. Nos. 5,627,242, 5,665,818 and 5,677,375, and European publications EP-A-0 794 200, EP-B1-0 649 992, EP-A-0 802 202, and EP-B-634 421.

In any of the embodiments described herein, the gas phase process may be operated in a condensed mode, where an inert condensable fluid is introduced to the process to increase the cooling capacity of the reactor system. These inert condensable fluids are referred to as induced condensing agents or ICA's. A condensable comonomer may contribute to condensed mode operation such as the following non-limiting examples: propylene, 1-butene, 1-pentene, 1-hexene, 1-heptene and 1-octene. For further details of a condensed mode processes see U.S. Pat. Nos. 5,342,749 and 5,436,304.

In an embodiment, the polymerization reactor can produce greater than 500 lbs of polymer per hour (227 Kg/hr) to about 300,000 lbs/hr (136,100 Kg/hr) or higher of polymer, or greater than 1000 lbs/hr (454 Kg/hr), preferably greater than 10,000 lbs/hr (4540 Kg/hr), more preferably greater than 25,000 lbs/hr (11,300 Kg/hr), still more preferably greater than 35,000 lbs/hr (15,900 Kg/hr), even more preferably greater than 50,000 lbs/hr (22,700 Kg/hr), and most preferably greater than 65,000 lbs/hr (29,500 Kg/hr) to greater than 100,000 lbs/hr (45,400 Kg/hr).

In some embodiments a fluidized bed polymerization reactor system that includes a recirculating system including a fast riser, a downcomer, and a recirculating pump, may be used. In this type of system, the polyethylene polymer is formed primarily in the fast riser, but continues to form throughout the system. Polymer particles formed in the fast riser pass through a line to an upper inlet port of the downcomer. The polymer particles gather in the downcomer, where they move downwardly in a dense, slow moving bed. The bed formed in the downcomer can be considered a fluidized bed.

In some embodiments, a liquid phase polymerization system, such as a liquid slurry phase polymerization reactor, suspension or solution reactor system may be used. Such a system generally comprises a reactor vessel to which an olefin monomer (e.g., ethylene) and a catalyst composition (e.g., chromium based catalyst) are added, individually or as a mixture combined prior to addition to the reactor vessel. The reactor vessel typically contains a liquid reaction medium for dissolving and/or suspending the polyethylene polymer. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isobutane, isopentane, hexane, cyclohexane, heptane, benzene, toluene, and the like. Slurry or solution polymerization systems may utilize sub-atmospheric or super-atmospheric pressures and temperatures in the range of about 40° C. to about 300° C. A useful liquid phase polymerization system is described in U.S. Pat. No. 3,324,095.

Reactive contact between the olefin monomer and the catalyst composition may be maintained by constant stirring or agitation, e.g., by a member such as a paddle or plunger rotating or moving through the reactor vessel (e.g., a stirred reactor or blender). Other types of liquid phase polymerization systems can be formed by a rotating drum (e.g., with or without internal baffles to enhance mixing), a vessel moving in a see-saw manner, agitation including ultrasonic vibrations applied to the materials or vessel, among others.

In general, the reactor systems and methods described herein can be used in connection with liquids and/or gases having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.0005 g/cc$^3$ to about 20 g/cc$^3$ and/or can have a dielectric constant ranging from about 1 to about 100. In many embodiments of the disclosure, the bulk material is a gaseous fluid. Gaseous fluids can, for example, generally have viscosities ranging from about 0.001 to about 0.1 cP, and/or can have densities ranging from about 0.0005 to about 0.1 g/cc$^3$ and/or can have a dielectric constant ranging from about 1 to about 1.1.

The bulk material can include relatively pure gaseous elements (e.g., gaseous $N_2$, gaseous $H_2$, gaseous $O_2$). Other components can include relatively pure liquid, solid, or gaseous compounds (e.g., liquid or solid catalyst, gaseous monomers). The various systems of the disclosures can also include single-phase or multi-phase mixtures of gases, solids and/or liquids, including for example: two-phase mixtures of solids and gases (e.g., fluidized bed systems), mixtures of gases with a single type of particle, mixtures of gases with different types of particles (e.g., polymer and catalyst particles); and/or three-phase mixtures of gases, liquids and solids (e.g., fluidized bed with liquid catalyst being added or liquid monomer or other liquid compound). Particular examples of preferred fluids are described herein, including in discussion below regarding preferred applications of the methods and devices of the disclosure.

According to the present disclosure, operating conditions for the polymerization reactor are determined for producing the polyethylene polymer. These operating conditions include, for example, an operating temperature for the polymerization reactor, a feed rate of the chromium based catalyst to the polymerization reactor, a feed rate of the ethylene monomer and optional comonomer with the chromium based catalyst in the polymerization reactor, a hydrogen concentration and an oxygen concentration in the polymerization reactor.

In generally preferred embodiments, the amount of hydrogen fed to the reactor system maintains in the fluidized bed reactor system about a molar ratio of hydrogen to monomer of between 0 and about 0.5 mol/mol. In other embodiments, hydrogen is fed to the reactor system to maintain in the fluidized bed reactor system about a molar ratio of hydrogen to monomer of between 0 and about 0.25 mol/mol, between 0 and about 0.1 mol/mol, and between 0 and about 0.05 mol/mol.

The catalysts and catalyst systems that may be used include chromium based catalysts and reduced chromium based catalysts. The chromium catalyst is formed by impregnating a $Cr^{+3}$ species into silica, followed by fluidization of the silica matrix at 400° C. to 900° C. Under these conditions, $Cr^{+3}$ is converted to $Cr^{+6}$.

Variations on chromium catalysts employing $Cr^{+6}$ species supported on silica are also known. One particular variation uses titanium tetraisopropoxide impregnated onto silica along with the $Cr^{+3}$ species before activation. This variation is referred to as "Ti—CrOx" (titanated chromium oxide). Such modifications result in polyethylenes with slightly greater molecular weight distributions compared to those made without titanation.

Aluminum alkyl reduced chromium oxide-on-silica (CrOx) catalysts represent one pathway to improved catalyst systems for polyethylenes and other polyolefins. It is desired that any such chromium based catalytic system perform well during high space-time yield operation (i.e., operation maximizing polymer produced per unit reactor time and reactor space), producing the greatest amount of polyethylene possible with high catalyst activity in a shorter residence time.

Information about these and other types of catalysts, including methods of preparation for chromium based catalysts, as well as characteristics of the polyethylene polymers formed is found in U.S. Pat. No. 6,989,344, among other places.

A chromium based catalyst reduced with a reducing agent will have certain properties based on the ratio of reducing agent to chromium. In a preferred embodiment, a chromium based catalyst used for the polyethylene polymer, applications includes a silica supported chromium oxide reduced with an aluminum alkyl compound. This type of catalyst provides a polyethylene with a broad molecular weight distribution.

In addition to the examples provided herein, polyolefins that may be produced according to the disclosure include, but are not limited to, those made from olefin monomers such as ethylene, as discussed herein, and linear or branched higher alpha-olefin monomers containing 3 to about 20 carbon atoms. Homopolymers or interpolymers of ethylene and such higher alpha-olefin monomers, with densities ranging from about 0.90 to about 0.965 may be made. Suitable higher alpha-olefin monomers include, for example, propylene, 1-butene, 1-pentene, 1-hexene, 4-methyl-1-pentene, 1-octene, and 3,5,5-trimethyl-1-hexene. Specific polyolefins that may be made include, for example, high density polyethylene, medium density polyethylene (including ethylene-butene copolymers and ethylene-hexene copolymers) homo-polyethylene, and polypropylene.

The post-reaction processing may include pelletizing the polyethylene polymer formed in the polymerization reactor. Such pelletization processes, known in the art, include extruding the polyethylene polymer through a narrow aperture, upon which the extruded polyethylene polymer is cut into pellets. The polyethylene polymer may be heated to facilitate extrusion. Prior to extrusion, additives may be added to the polyethylene polymer. In another approach, the polyethylene polymer is processed to form extruded strands. In a further approach, granules of the polyethylene polymer are compressed into a larger composite block. Those skilled in the art will appreciate that other forms of post-reaction processing may be performed.

EXAMPLES

Some embodiments of the present disclosure will now be described in detail in the following examples.

Fluidized Bed Gas Phase Polymerization Reactor

A polyethylene polymer was produced in a commercial scale fluidized bed gas phase polymerization reactor operating at 100° C. and 295 psig (2.04 MPa) total reactor pressure having a water cooled heat exchanger. Prior to starting these examples using a chromium based catalyst, a feed of ethylene was adjusted to provide an ethylene partial pressure of about 198 psia (1.36 MPa). A feed of oxygen was also adjusted to provide an oxygen to ethylene ($O_2/C_2$) molar feed ratio of 38 $ppb_v$. The chromium based catalyst was ACCLAIM™ K-100 Catalyst (Univation Technologies, Houston Tex.). The catalyst feed rate of the chromium based catalyst was set to 2.8 kg/hr with a predetermined residence time of 3 hours.

For the polyethylene polymers of the following Examples, the residence time (hrs) for the polyethylene polymer is shown in FIG. 2A, the production rate in tonne/hour is shown in FIG. 2B, the melt flow index ($I_{21}$) dg/min, measured according to ASTM D1238) is shown in FIG. 2C, the $O_2/C_2$ molar feed ratio $ppb_v$ is shown in FIG. 2D, and catalyst feed rate (kg/hr) and catalyst productivity (tonne polyethylene/kg catalyst) is seen in FIG. 2E.

Comparative Example A

Referring now to FIG. 2A-2E, beginning at time zero 200 (T=0) the $O_2/C_2$ molar feed ratio was increased from about 38 $ppb_v$ to about 55 $ppb_v$ (FIG. 2D) to increase the melt flow index ($FI_{21}$ dg/min, MFI) targeting the center of the predetermined desired range of the MFI, where the predetermined desired range is from 9 to 11.5 dg/min. After a gradual increase in catalyst productivity and polymer production rate, there was a gradual decrease in the two starting about 6.5 hours 210 after T=0. The polymer average residence time steadily decreased until reaching a shallow minimum before turning and starting to increase, also at about 6.5 hours 210 after T=0. The MFI during this time remained approximately at the bottom of the predetermined desired range, thus highlighting that the change in $O_2/C_2$ molar feed ratio failed to change the MFI given the dominating effects of the polymer average residence time in the reactor. Had this approach been maintained, the longer residence time resulting from the $O_2/C_2$ Molar Feed Ratio increase would have caused a decrease in MFI, thus further offsetting the intent of the $O_2/C_2$ increase. Comparative Example A illustrates what can go wrong when the catalyst feed rate is not changed prior to changes in the $O_2/C_2$ Molar Feed Ratio as provided herein.

Example 1

At 8 hours 220 after T=0, the catalyst feed rate of the chromium based catalyst, which was constant until then, was increased steadily over time from 2.80 kg/hr to 3.48 kg/hr. This change in the catalyst feed rate was calibrated to preemptively compensate for the subsequent change in the oxygen flow rate of the feed of oxygen, via changes to the $O_2/C_2$ gas mole feed ratio, that is an adjustment for maintaining the predetermined residence time and for bringing the MFI of the polyethylene polymer into the predetermined desired range of the MFI. The $O_2/C_2$ increase was made at about 9.33 hours 230 after T=0 with an increase from about 55 $ppb_v$ to about 66 $ppb_v$. The MFI moved from about the low end of the predetermined desired range to about the top end of the predetermined desired range. By about 16 hours 240 after T=0 the catalyst feed was at about 4 kg/hr and $O_2/C_2$ remained at about 66 $ppb_v$.

At 28 hours 250 after T=0 the catalyst feed rate was decreased. The trailing $O_2/C_2$ gas mole feed ratio was decreased at about 30 hours 260 after T=0. This was 2 hours after the earlier adjustment to the catalyst feed rate. The resulting MFI values moved from the top end of the predetermined desired range (e.g., about 11.5) to about the middle of the predetermined desired range 270.

Comparative Example B

In Comparative Example B a reduction was made in the catalyst feed rate followed by no change in $O_2/C_2$ gas mole feed ratio. As a result, the residence time increased and the MFI went to the bottom of the predetermined desired range of the MFI. Specifically, as seen in FIGS. 2A-2E, from about 33.33 hours 280 to 34.5 hours 290 after T=0 the catalyst feed rate was decreased from about 4 kg/hr to about 3.2 kg/hr and then to 3.0 kg/hr at about 36.5 hours 294 after T=0. There was no subsequent change in the $O_2/C_2$ gas mole feed ratio. The MFI eventually moved to the bottom of the predetermined desired range of the MFI (e.g., about 9 dg/min).

We claim:

1. A method for producing a polyethylene polymer in a polymerization reactor, the polymerization reactor receiving a feed of ethylene, a feed of a chromium based catalyst and a feed of oxygen, wherein the polyethylene polymer produced in the polymerization reactor has a predetermined residence time in the polymerization reactor and a predetermined desired range of a melt flow index (MFI), the method comprising:
   (a) measuring the MFI of the polyethylene polymer being produced in the polymerization reactor at the predetermined residence time to give a measured MFI value of the polyethylene polymer;
   (b) comparing the measured value of the MFI of the polyethylene polymer to the predetermined desired range of the MFI to give a comparison;
   (c) changing a catalyst feed rate of the feed of the chromium based catalyst to the polymerization reactor when, based on the comparison, the measured value of the MFI is outside the predetermined desired range of the MFI, wherein the change in the catalyst feed rate of the feed of the chromium based catalyst is calibrated to preemptively compensate for an anticipated subsequent change in the oxygen flow rate of the feed of oxygen to the polymerization reactor, wherein the anticipated subsequent change in oxygen flow rate of the feed of oxygen to the polymerization reactor is an adjustment for maintaining the predetermined residence time and for bringing the MFI of the polyethylene polymer being produced in the polymerization reactor into the predetermined desired range for the MFI of the polyethylene polymer;
   (d) at a predetermined time after starting (c), changing the oxygen flow rate of the feed of oxygen to the polymerization reactor thereby both maintaining the predetermined residence time and bringing the MFI of the polyethylene polymer being produced in the polymerization reactor with the chromium based catalyst into the predetermined desired range of the MFI of the polyethylene polymer; and
   (e) repeating (a) and (b) after (d) to determine that the measured value of the MFI is within the predetermined desired range of the MFI at the predetermined residence time; wherein the method is a gas phase polymerization method and the polymerization reactor is a gas phase polymerization reactor.

2. The method of claim 1, wherein the changing of the catalyst feed rate of the feed of the chromium based catalyst to the polymerization reactor includes increasing the catalyst feed rate to the polymerization reactor; and
   wherein changing the oxygen flow rate of the feed of oxygen to the polymerization reactor includes increasing the oxygen flow rate to the polymerization reactor at the predetermined time selected from 15 minutes to 2 hours after starting step (c).

3. The method of claim 1, wherein the changing of the catalyst feed rate of the feed of the chromium based catalyst to the polymerization reactor includes decreasing the catalyst feed rate to the polymerization reactor; and
   wherein changing the oxygen flow rate of the feed of oxygen to the polymerization reactor includes decreasing the oxygen flow rate to the polymerization reactor at the predetermined time selected from 15 minutes to 2 hours after starting step (c).

4. The method of claim 1, wherein the changing the oxygen flow rate of the feed of oxygen to the polymerization reactor brings the MFI of the polyethylene polymer being produced in the polymerization reactor to a median value of the predetermined desired range for the MFI of the polyethylene polymer.

5. The method of claim 1, wherein the oxygen flow rate of the feed of oxygen to the polymerization reactor is from 1 ppb to 500 ppb by volume of the feed of ethylene to the polymerization reactor.

6. The method of claim 1, wherein changing the oxygen flow rate of the feed of oxygen to the polymerization reactor maintains the predetermined residence time at a constant value.

7. The method of claim 6, wherein the changing the catalyst feed rate of the feed of a chromium based catalyst to the polymerization reactor maintains both a constant production rate of the polyethylene polymer being produced in the polymerization reactor and the constant value of the predetermined residence time of the polyethylene polymer being produced in the polymerization reactor.

8. The method of claim 1, wherein the polyethylene polymer is produced at a constant production rate.

* * * * *